United States Patent
Bengtsson et al.

(10) Patent No.: US 11,923,933 B2
(45) Date of Patent: *Mar. 5, 2024

(54) OPERATING COMMUNICATION DEVICES

(71) Applicant: Sony Group Corporation, Tokyo (JP)

(72) Inventors: Erik Bengtsson, Eslov (SE); Thomas Bolin, Lund (SE); Olof Zander, Södra Sandby (SE); Fredrik Rusek, Eslöv (SE); Kun Zhao, Stockholm (SE); Zuleita Ho, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,408

(22) Filed: Oct. 13, 2022

(65) Prior Publication Data

US 2023/0036055 A1 Feb. 2, 2023

Related U.S. Application Data (63) Continuation of application No. 17/278,314, filed as application No. PCT/EP2019/077515 on Oct. 10, 2019, now Pat. No. 11,502,732.

(30) Foreign Application Priority Data

Oct. 12, 2018 (SE) .................................. 1830289-3

(51) Int. Cl.
*H04B 7/0456* (2017.01)
*H04B 7/06* (2006.01)

(52) U.S. Cl.
CPC ......... *H04B 7/0478* (2013.01); *H04B 7/0469* (2013.01); *H04B 7/0691* (2013.01); *H04B 7/0695* (2013.01)

(58) Field of Classification Search
CPC .. H04B 7/0478; H04B 7/0469; H04B 7/0691; H04B 7/0695; Y02D 30/70
See application file for complete search history.

(56) References Cited

U.S. PATENT DOCUMENTS 11,502,732 B2 * 11/2022 Bengtsson ........... H04B 7/0691
2012/0219043 A1   8/2012 Ko et al.
(Continued)

FOREIGN PATENT DOCUMENTS

CN   102792605 A   11/2012
CN   105103463 A   11/2015
(Continued)

OTHER PUBLICATIONS

Lenovo et al., "Discussion on UL multi-panel transmission"; 3GPP TSG RAN WG1 Meeting #96bis; R1-1904574, Apr. 8-12, 2019, 8 pages.

*Primary Examiner* — Kenneth T Lam
(74) *Attorney, Agent, or Firm* — Tucker Ellis LLP (57) ABSTRACT

A method includes receiving (402) a plurality of reference signals (301-303) at an antenna port of a communication device (101). Each reference signal (301-303) is sent using a corresponding precoder. The precoder is selected from a first set of precoders. The method further includes determining (403) a channel estimate based on the received plurality of reference signals (301-303), and selecting (404) a precoder from a second set of precoders based on the determined channel estimate. The second set of precoders comprises at least one precoder in addition to the precoders of the first set of precoders. The method includes sending (405) an indication (304) relating to the selected precoder.

19 Claims, 3 Drawing Sheets

(56) References Cited

U.S. PATENT DOCUMENTS

| | | |
|---|---|---|
| 2017/0331544 A1 | 11/2017 | Athley et al. |
| 2018/0249453 A1* | 8/2018 | Nagaraja ............... H04B 7/0632 |
| 2018/0295631 A1 | 10/2018 | Fröberg Olsson |
| 2020/0274585 A1 | 8/2020 | Huang et al. |
| 2021/0120499 A1 | 4/2021 | Su |

FOREIGN PATENT DOCUMENTS

| | | |
|---|---|---|
| WO | WO-2016114696 A1 | 7/2016 |
| WO | WO-2017034169 A1 | 3/2017 |
| WO | WO-2018056789 A1 | 3/2018 |
| WO | WO-2018132781 A1 | 7/2018 |
| WO | 2018186778 A1 | 10/2018 |

* cited by examiner

OPERATING COMMUNICATION DEVICES

TECHNICAL FIELD

Various embodiments of the invention generally relate to operating communication devices, for example a terminal device and a base station. Various examples of the invention specifically relate to selecting and establishing precoders in codebook based transmissions.

BACKGROUND

For increasing data transmission performance and reliability, a so called multiple-input and multiple-output technology (MIMO) may be used in wireless radio frequency telecommunications for transmitting information between communication devices, for example a base station and a terminal device. The MIMO technology relates to the use of multiple send and receive antennas for a wireless communication at the base station and/or at the terminal device. The MIMO technology forms the basis for coding methods, which use the temporal as well as the spatial dimension for transmitting information and enables therefore a space and time coding. Thus, a quality and data rate of the wireless communication may be increased.

The base station may include a large number of antennas, for example, several tens or even in excess of one hundred antennas with associated transceiver circuitry. Systems comprising such base stations are also called massive MIMO systems. The extra antennas of the massive MIMO base station allow radio energy to be spatially focused in transmissions as well as a directional sensitive reception, which improves spectral efficiency and radiated energy efficiency. For example, in a massive MIMO system, all or multiple beams or signals from different radiation paths may be coherently combined such that a higher gain may be achieved.

Likewise, the terminal device may include a plurality of antennas to allow radio energy to be spatially focused in transmissions as well as a directional sensitive reception, which improves spectral efficiency and radiated energy efficiency.

In order to adapt transmit and receive signals at each individual antenna of the base station in accordance with the currently active terminal device, a base station logic needs information about wireless radio channel properties between the terminal device and the antennas of the base station. A pilot signaling scheme, a so-called channel sounding, is used for this purpose, which allows the base station to set configuration antenna parameters for transmitting signals, so as to focus radio energy at the terminal device and/or for receiving radio signals from the terminal device. Thus, focus may mean both phase align contribution with different path lengths and transmit only in directions that will reach the terminal device. Training sequences, so-called pilot signals, may be transmitted from the terminal device in a resource that is dedicated to the terminal device. Pilot signals from different terminal devices need to be orthogonal in order for the base station to identify the configuration parameters for the plurality of antennas for each one of the terminal devices. Orthogonality may be achieved by using time division multiple access (TDMA), code division multiple access (CDMA) or frequency division multiple access (FDMA) technologies or a combination thereof.

For example, systems according to LTE (Long Term Evolution) technologies and standards, support both frequency division duplex (FDD) and time division duplex (TDD) modes. While FDD makes use of paired spectra for uplink (UL) and downlink (DL) transmission separated by a duplex frequency gap, TDD splits one frequency carrier into alternating time periods for transmission from the base station to the terminal device and vice versa. Both modes have their own frame structures within LTE and these are aligned with each other meaning that similar hardware can be used in the base stations and terminal devices to allow for economy of scale. The LTE transmission is structured in the time domain in radio frames. Each of these radio frames is 10 ms long and consists of 10 sub-frames of 1 ms each. The Orthogonal Frequency Division Multiple Access (OFDMA) sub-carrier spacing in the frequency domain is 15 kHz. Twelve of these sub-carriers together allocated during a 0.5 ms timeslot are called a resource block. Each resource block may contain a plurality of resource elements. An LTE terminal device can be allocated, in the downlink or uplink, a minimum of two resource blocks during one sub-frame (1 ms). A resource block, defined by its time slot and set of sub-carriers, is the smallest unit of resources that can be allocated to a terminal device or user. Data transmitted via resource blocks in a plurality of consecutive frames is also called "stream".

In case the MIMO system uses time division multiple access (TDMA) or frequency division multiple access (FDMA), each terminal device can transmit a pilot signal in a specifically allocated resource (defined by its time slot and frequency range within a frame). The pilot signal can be received by the antennas of the base station and analyzed by the base station logic for channel sounding the uplink radio channel. Vice versa, the base station may transmit a pilot signal in an allocated resource to a terminal device for channel sounding the downlink radio channel. The timeslots and frequency ranges, in which terminal devices may transmit their pilot signals in combination, are also referred to as pilot portion of a transmission frame. The remaining timeslots and frequency ranges of the frame may be used for downlink (DL) and uplink (UL) data and control transmission. The pilot signals may each include a training sequence, and the pilot signals received at the plurality of antennas of the base station are analyzed by the base station logic. Information about a radio channel property of the radio channel between the terminal device and the plurality of antennas may be obtained as a result of this analysis. A base station may use the results of the analysis to determine configuration parameters for transmitting signals via the antennas to the respective terminal devices and for receiving signals via the antennas from the respective terminal devices. For example, based on the received uplink pilot signal, receive configuration parameters may be obtained and transmit configuration parameters may be obtained based on reciprocity.

Many terminal devices, for example handsets like mobile phones, provide two or even more antennas for cellular communication. The antennas of the terminal device are typically arranged spaced apart from each other at or within the housing of the terminal device, e.g. one antenna at a top and one at a bottom of the terminal device. For massive MIMO systems, channel sounding may be needed for all antennas of the terminal device. The terminal device may provide a corresponding number of receiver chains as required for simultaneous signal transmissions on each antenna and in each supported band such that MIMO downlink communication may be supported in each band.

For uplink communication, two transmission schemes may be supported: codebook based transmission and non-codebook based transmission. For non-codebook based transmission, an antenna configuration for each antenna of the terminal device may be determined based on measurement or configuration information from the base station, for example based on channel reciprocity. The antenna configuration for each antenna may comprise for example a phase and a gain information for each antenna. In particular channels that do not have uplink downlink reciprocity, the uplink transmission may be codebook based. In codebook based transmission, a set of antenna configurations, so-called precoders, is provided. For example, each precoder may define for each antenna of the terminal device a corresponding phase and gain information. The set of precoders may be limited. When selecting a precoder, coherence capability of the terminal device for uplink MIMO transmission may be considered. The term coherence may relate to the coherence between antenna ports. For example, if a terminal device is capable of a coherent transmission at certain antenna ports, it is possible to have those antenna ports with a same phase or with a constant and known phase offset. However, if the terminal device transmits signals from two antenna panels from different sides of the terminal device, these two panels may be non-coherent due to their physical distance.

Different levels of coherence capability may be defined. For example in 3GPP LTE and 5G-NR architecture (see e.g. 3GPP TS 38.214 V2.0.0 (2017-12)), three levels of coherence capability are defined: "full coherence" indicating a coherent transmission via all antenna ports, "partial coherence" indicating that a coherent transmission via at least one antenna port pair is possible, and "non-coherence" indicating that no port pair supports a coherent transmission. In the following, mainly a distinction between coherence and non-coherence will be made. The term "coherence" may therefore comprise "full coherence" and "partial coherence" unless specifically noted otherwise.

In codebook based transmissions, the terminal device may broadcast its coherence capability to the network by a corresponding notification when the terminal device is registering at the network. Further, terminal devices which are capable of non-coherent transmissions only, so-called non-coherent terminal devices, may only be assigned with precoders within an even more restricted set of precoders, which may be termed "non-coherent codebook set". This non-coherent codebook set may contain only precoders that have only one non-zero entry in each column of a vector of the precoder, meaning that the precoder is only selecting one antenna element but not combining a plurality of antenna elements. Such precoders may be termed "non-coherent precoders". In contrast, the remaining precoders enabling a transmission using a combination of at least two antenna ports may be termed "coherent precoders". As a result, transmit diversity among any pair of antenna elements is not possible with the precoders of the non-coherent codebook set.

SUMMARY

Therefore, a need exists for advanced techniques of operating communication devices in MIMO environments. Specifically, a need exists for techniques, which overcome or mitigate at least some of the above-identified restrictions and drawbacks. This need is met by the features of the independent claims. The features of the dependent claims define embodiments.

A method for operating a wireless communication device, for example a base station, comprises receiving a plurality of reference signals at an antenna port of the communication device. The reference signals may be sent from a terminal device, for example a terminal device having non-coherent transmission capabilities only. For example, the terminal device is configured to communicate with at least two beams, but limited in that the beams are non-coherent. Each reference signal may comprise a corresponding sounding reference signal (SRS) as defined for example in 3GPP standards. Each reference signal is sent using a corresponding precoder. The precoder being selected from a first set of precoders. The first set of precoders may comprise for example a subset of the codebook set defined for the terminal device, in particular the non-coherent codebook set. The method comprises determining a channel estimate based on the received plurality of reference signals, and selecting a precoder from a second set of precoders based on the determined channel estimate. The channel estimate may refer to channel state information (CSI). The second set of precoders comprises at least one precoder in addition to the precoders of the first set of precoders. For example, the second set of precoders may comprise the codebook set defined for the terminal device including the non-coherent precoders as well as the coherent precoders. Further, the method includes sending an indication relating to the selected precoder. The indication relating to the selected precoder is sent to the terminal device from which the reference signals were received. The terminal device from which the reference signals were received may use the selected precoder for transmitting data to the communication device. As the selected precoder is not restricted to the non-coherent precoders, but may also be selected from the coherent precoders, which allows combining signals from different antenna ports, a higher multiplexing gain may be reached.

Receiving the plurality of reference signals may comprise receiving multiple times each reference signal sent by the terminal device using the corresponding precoder. Determining the channel estimate may be based on a statistical model, for example a statistical model for a random variable, considering the reference signals received multiple times from the terminal device using the corresponding precoders. For example, the terminal device may comprise two antennas and may transmit sounding reference signals using two different non-coherent precoders, a first non-coherent precoder and a second non-coherent precoder. Determining the channel estimate may be based on multiple sounding reference signals sent from the terminal device using the first non-coherent precoder and on multiple sounding reference signals sent from the terminal device using the second non-coherent precoder. For example, determining the channel estimate may be based on at least two sounding reference signals precoded with each of the non-coherent precoders, i.e. at least two sounding reference signals sent using the first non-coherent precoder and at least two sounding reference signals sent using the second non-coherent precoder.

According to various examples, the method may comprise receiving a data signal, which is sent using the selected precoder, and determining a further channel estimate based on the received data signal. Based on the determined further channel estimate a further precoder from the second set of precoders may be selected, and an indication relating the selected further precoder may be sent. Thus, more frequent updates of the precoder to be used by the terminal device can be accomplished for compensating variations in the channel between the terminal device and the communication device, for example due to a movement of the terminal device.

Determining the further channel estimate may comprise for example determining the further channel estimate based on a time schedule of the received data signal. Further, determining the further channel estimate may comprise determining the further channel estimate using a time-adaptive filter based on the time schedule of the received data signal. As the communication device, for example the base station, knows the time schedule of the uplink transmission, the time-adaptive filter for estimating a random phase, for example a Kalman filter or Alpha beta filter, can be used. When the optimal precoder changes the based on the adaptive channel estimate, the communication device may signal the updated precoder to the terminal device. The communication device may signal the updated precoder to the terminal device only if the optimal precoder has changed. The terminal device may then use the updated precoder in the following uplink transmissions.

The data signal may comprise at least one of a signal carrying payload, a signal carrying control information, and a sounding reference signal. Thus, the communication device may adapt and update the precoder based on a broad variety of signals received from the terminal device.

The indication relating to the selected precoder may comprise at least one of an index indicative of an entry in the second set of precoders corresponding to the selected precoder, and at least one parameter defining the selected precoder.

The method may further include receiving capability information relating to a further wireless communication device, e.g. the terminal device, which sends the plurality of reference signals. The capability information may indicate that the further communication device is restricted to non-coherent transmissions. Additionally or as an alternative, the capability information may indicate that the further communication device is restricted to partial coherent transmissions, wherein a selected subset of beams used for communication with the wireless communication device is non-coherent.

Receiving the plurality of reference signals may comprise receiving the plurality of reference signals at an antenna array coupled to the antenna port. The antenna array comprises at least two antennas. The antennas may be arranged near by the communication device or maybe arranged spaced apart from the communication device.

The method may furthermore comprise allocating resources for receiving a further plurality of reference signals, for example based on the further channel estimate. According to the method, a resource allocation message indicating the allocated resources may be sent, for example to the terminal device.

A further method for operating a wireless communication device, for example a terminal device is provided. The communication device comprises at least two antenna ports. Each antenna port is coupled to a corresponding antenna. The method comprises sending a plurality of reference signals via the at least two antenna ports. Each reference signal is sent using a precoder selected from a first set of precoders. Each reference signal may comprise a corresponding sounding reference signal. The method includes receiving an indication relating to a selected precoder selected from a second set of precoders, and sending a data signal using the selected precoder. The second set of precoders comprises at least one precoder in addition to the precoders of the first set of precoders. For example, the second set of precoders may comprise a codebook set defined for the communication device including non-coherent precoders as well as coherent precoders, whereas the first set of precoders includes the non-coherent precoders only.

The method may comprise sending capability information indicating that the communication device is restricted to non-coherent transmissions. Additionally or as an alternative, the capability information may indicate that the communication device is restricted to partial coherent transmissions, wherein a selected subset of beams used for communication is non-coherent.

The method may further comprise receiving an indication relating to a selected further precoder selected from the second set of precoders, and sending a further data signal using the selected further precoder.

The indication relating to the selected precoder comprises at least one of an index indicative of an entry in the second set of precoders corresponding to the selected precoder, and at least one parameter defining the selected precoder. Transmitting the index may reduce required transmission capacity. Transmitting parameters defining the selected precoder enables defining additional and/or new precoders which were not predefined.

The data signal may comprise at least one of a signal carrying payload, a signal carrying control information, and a sounding reference signal.

A first antenna coupled to a first antenna port of the at least two antenna ports may be arranged at a first side of the communication device, and a second antenna coupled to a second antenna port of the at least two antenna ports may be arranged at a second side of the communication device different from the first side.

Each precoder of the first set of precoders may be configured such that a signal, which is sent using the precoder, is sent via only one of the at least two antenna ports.

The second set of precoders may comprise at least one precoder configured such that the data signal using the at least one precoder is sent via at least two of the at least two antenna ports. Optionally, the data signal may be sent via the at least two antenna ports with a phase shift. Further, optionally the data signal may be sent via the at least two antenna ports with different gains.

A wireless communication device, for example a base station, comprises control circuitry configured to receive a plurality of reference signals at an antenna port of the communication device. Each reference signal is sent using a corresponding precoder. Each reference signal may comprise a sounding reference signal. The precoder is selected from a first set of precoders. The control circuitry is further configured to determine a channel estimate based on the received plurality of reference signals, to select a precoder from a second set of precoders based on the determined channel estimate, and to send an indication relating to the selected precoder. The second set of precoders comprises at least one precoder in addition to the precoders of the first set of precoders.

The control circuitry may be configured to perform any one of the above described methods.

A wireless communication device, for example a terminal device, comprises at least two antenna ports and control circuitry. Each antenna port is coupled to a corresponding antenna. The control circuitry is configured to send a plurality of reference signals via the at least two antenna ports. Each reference signal is sent using a precoder selected from a first set of precoders. The control circuitry is configured to receive an indication relating to a selected precoder selected from a second set of precoders, and to send a data signal using the selected precoder. The second set of precoders comprises at least one precoder in addition to the precoders of the first set of precoders.

The control circuitry may be configured to perform any one of the above described methods.

A computer program product or computer program includes program code. Execution of the program code causes control circuitry to perform a method of operating a communication device, for example a terminal device or a base station, as defined above.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements are not necessarily shown to scale. Rather, the various elements are represented resented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication in a network are disclosed. For example, the network may be a cellular network including multiple cells, wherein each cell is defined by one or more base stations (BSs). Example network architectures include the 3GPP LTE and 5G-NR architectures. According to 3GPP LTE, a wireless channel is defined according to the evolved UMTS Terrestrial Radio Access (EUTRAN). Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. In particular, such techniques may be applied in 3GPP NB-IoT or eMTC networks and 3GPP New Radio (NR) networks. Furthermore, respective techniques may be readily applied to various kinds of non-3GPP-specified architectures, such as Bluetooth, satellite communication, IEEE 802.11x Wi-Fi technology, etc.

The techniques described herein may facilitate determining beams or spatially directed radio signals used for transmission of data—e.g., payload data such as application data or control data such as Layer 2 or Layer 3 control data between for example a base station and a terminal device. These techniques may utilize a plurality of antennas at the base station and/or at the terminal device. As such, the techniques described herein may generally facilitate efficient beamforming and/or spatial diversity, for example as defined according to MIMO techniques. Facilitating beamforming may, in turn, facilitate spatial multiplexing at high frequencies, e.g., above 1 GHz or 10 GHz or even above 50 GHz. For example, for adjusting antenna weights, a channel sounding may be required. For example, a sounding reference signal (SRS) or pilot signal may be transmitted uplink from the terminal device to the base station. Based on the received SRS or pilot signal, the base station may determine and adjust antenna weights for downlink transmissions.

The techniques described herein facilitate communication of uplink signals from the terminal device to the base station.

According to examples, a plurality of sounding reference signals is received at an antenna port of the base station. Each sounding reference signal is sent using a corresponding precoder. The precoder is selected from a first set of precoders. Based on the received plurality of sounding reference signals, the base station determines a channel estimate, for example a channel state information (CSI). Based on the determined channel estimate, the base station selects a precoder from a second set of precoders. The second set of precoders comprises at least one precoder in addition to the precoders of the first set of precoders. An indication relating to the selected precoder is sent to the terminal device. The first set of precoders may comprise non-coherent precoders only. Therefore, the first set of precoders may also be termed restricted set of precoders and corresponds to the non-coherent codebook set. The second set of precoders may comprise non-coherent precoders as well as coherent precoders. Therefore, the second set of precoders may also be termed unrestricted set of precoders.

According to further examples of, the terminal device comprises at least two antenna ports. Each antenna port is coupled to a corresponding antenna. The terminal device sends a plurality of sounding reference signals via the at least two antenna ports. Each sounding reference signal is sent using a precoder selected from the first set of precoders. An indication relating to a selected precoder selected from the second set of precoders is received at the terminal device, and the terminal device sends a data signal using the selected precoder. The data signal may comprise for example a payload carrying signal, a control information carrying signal and/or a sounding reference signal.

In further examples, the base station receives the data signal which is sent by the terminal device using the selected precoder and determines a further channel estimate based on the received data signal. The base station selects a further precoder from the second set of precoders based on the determined further channel estimate, and sends an indication relating to the selected further precoder to the terminal device.

In further examples, the terminal device receives the indication relating to the selected further precoder selected from the second set of precoders, and sends further data signals using the selected further precoder. Thus, the base station may continuously update the precoder for the terminal device based on data signals received from the terminal device. Due to the more frequent update of the precoder, the base station may select precoders from the second unrestricted set of precoders, although the terminal device may not be capable of coherent transmissions, for example due to its antenna arrangement.

For example, this may enable to consider training signals or data signals as training signals more frequently, and the precoders are no longer restricted to be selected from the non-coherent codebook set.

Figure 1:
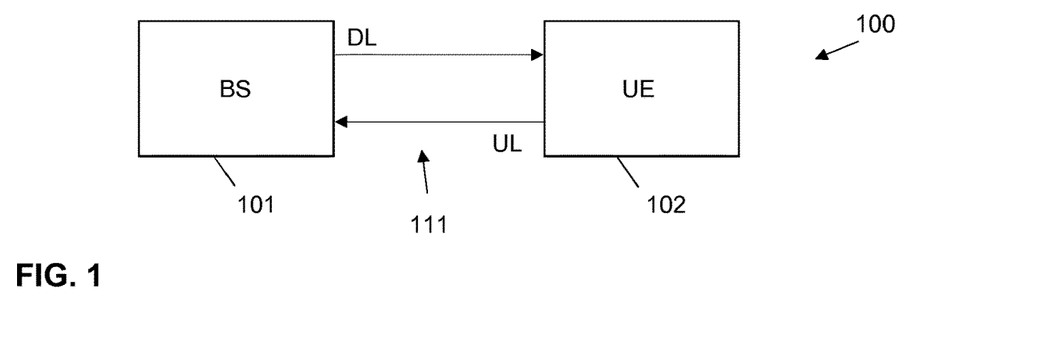
FIG. 1 schematically illustrates communication on a wireless link between a base station and a terminal device according to various examples.

FIG. 1 schematically illustrates a wireless communication network 100 that may benefit from the techniques disclosed herein. The network may be a 3GPP-standardized network such as 3G, 4G, or upcoming 5G NR. Other examples include point-to-point networks such as Institute of Electrical and Electronics Engineers (IEEE)-specified networks, e.g., the 802.11x Wi-Fi protocol or the Bluetooth protocol. Further examples include 3GPP NB-IOT or eMTC networks.

The network 100 includes a base station BS 101 and a terminal device 102, for example a user equipment (UE). The terminal device 102 may comprise for example a mobile telephone, a notebook, an Internet of Things (IoT) device, or a Machine Type Communication (MTC) device. A wireless link 111 is established between the BS 101—e.g., an eNB in a 3GPP LTE framework or a gNB in the 3GPP NR framework—and the UE 102. The wireless link 111 includes a downlink (DL) wireless link from the BS 101 to the UE 102; and further includes an uplink (UL) wireless link from the UE 102 to the BS 101. Time-division duplexing (TDD), frequency-division duplexing (FDD), and/or code-division duplexing (CDD) may be employed for mitigating interference between UL and DL. Likewise, TDD, FDD, CDD and/or spatial division duplexing (SDD) may be employed for mitigating interference between multiple UEs communicating on the wireless link 111 (not shown in FIG. 1).

The UE 102 may be one of the following: a smartphone; a cellular phone; a tablet; a notebook; a computer; a CPE; a smart TV; an MTC device; an eMTC device; an IoT device; an NB-IoT device; a sensor; an actuator; etc.

Figure 2:
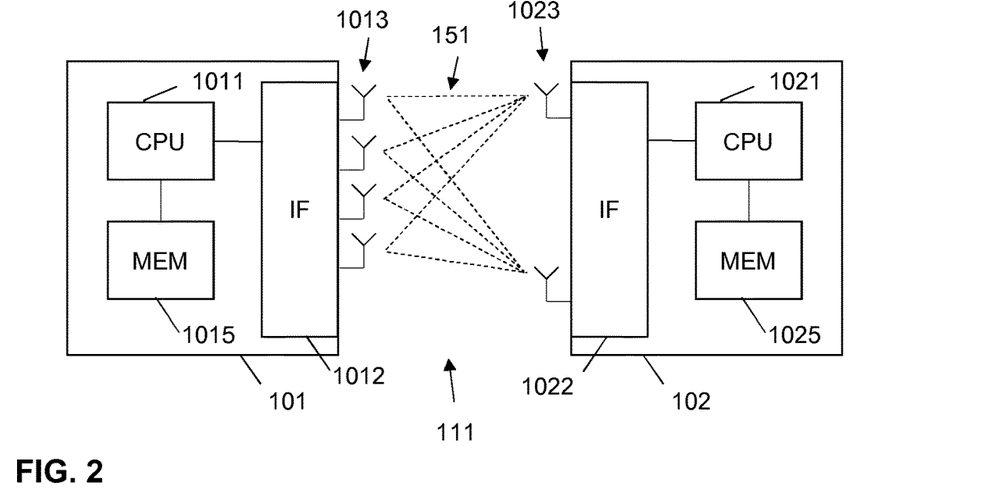
FIG. 2 schematically illustrates communication on a wireless link between a base station and a terminal device according to various examples, wherein FIG. 2 further illustrates multiple propagation paths associated with multiple antennas.

FIG. 2 schematically illustrates the BS 101 and the UE 102 in greater detail. The BS 101 includes a processor 1011 and an interface 1012, sometimes also referred to as frontend. The interface 1012 is coupled via antenna ports (not shown in FIG. 2) with an antenna array 1013 including a plurality of antennas. In some examples, the antenna array 1013 may include at least 30 antennas, optionally at least 100 antennas, further optionally at least 200 antennas. Antenna arrays are sometimes also referred to as antenna patch. Sometimes, a scenario implementing a large number of antennas is referred to as full dimension multi-input multi-output (FD-MIMO) or massive multi-input multiple-output (Massive MIMO, MaMi).

The BS 101 further includes a memory 1015, e.g., a non-volatile memory. The memory may store program code that can be executed by the processor 1011. Executing the program code may cause the processor 1011 to perform techniques with respect to communicating one or more downlink signals, and remote controlling UE management as disclosed herein. Thus, the processor 1011 and the memory 1015 form a control circuitry.

It is to be noticed that the BS 101 may include a plurality of base stations to which the UE 102 is connected. For example, the UE 102 may be connected to a base station operating according to LTE and additionally the UE 102 may be connected to a base station operating according to 5G-NR. In particular in case of aggregated bandwidth combining communication on an LTE carrier as well as a 5G-NR carrier, the BS 101 may represent the LTE base station and the 5G-NR base station to which the UE 102 is communicating.

The UE 102 includes a processor 1021 and an interface 1022, sometimes also referred to as frontend. The interface 1022 is coupled via antenna ports (not shown in FIG. 2) with an antenna array 1023 including a plurality of antennas. In some examples, the antenna array 1023 may include at least two antennas, optionally at least 6 antennas, and further optionally at least 16 antennas. Generally, the antenna array 1023 of the UE 102 may include fewer antennas than the antenna array 1013 of the BS 101.

The UE 102 further includes a memory 1025, e.g., a non-volatile memory. The memory 1025 may store program code that can be executed by the processor 1021. Executing the program code may cause the processor 1021 to perform techniques with respect to communicating one or more uplink signals, for example uplink pilot signals (e.g. SRS), and precoder management as described herein. Thus, the processor 1021 and the memory 1025 form a control circuitry.

FIG. 2 also illustrates aspects with respect to propagation channels 151. FIG. 2 schematically illustrates that different propagation channels 151 (dashed lines in FIG. 2) are implemented on the wireless link 111. For example, to implement a certain propagation channel 151 for DL communication, a certain DL transmit beam may be selected for the antenna array 1013 of the BS 101. Here, the beam may generally be implemented by certain values of antenna weights of the antennas and antenna ports of the respective antenna array 1013, 1023. Sometimes, the antenna weights are also referred to as steering vectors or precoding parameters. In particular when configuring the antennas of the antenna array 1023 of the UE 102, the precoding parameters for a specific configuration is termed "precoder". Accordingly, different beams may be addressed by using different amplitude and phase configurations for the various antennas and antenna ports of the respective antenna arrays 1013, 1023, i.e., different values for the antenna weights, for example by selecting a corresponding precoder.

While in FIG. 2 line-of-sight propagation channels 151 are illustrated, in other examples, non-line-of-sight propagation channels 151 are possible.

Different ones of the propagation channels 151 may have different transmission characteristics such as number of reflections, path loss, and general transmission reliability and/or capacity. In particular, different propagation channels 151 can have different fading profiles at the position of the respective receiver. Fading typically occurs due to destructive interference of reflected electromagnetic waves carrying the signals at the position of the receiver. Thus, the link performance will vary significantly depending on the selected propagation channel 151. By using appropriate propagation channels 151, by determining the appropriate values for the antenna weights, for example selecting the appropriate precoder, diversity can be provided to reduce fading. According to various examples described herein, selection of the appropriate values for the antenna weights is facilitated through channel sounding.

To sound the wireless link 111 and the various propagation channels 151, one or more pilot signals can be transmitted and received.

Such pilot signals as described herein may generally have a well-defined symbol sequence and/or transmission power such that based on a receive property of the pilot signals it is possible to sound the wireless link. Sometimes, the pilot signals may also be referred to as sounding reference signals (SRS) or synchronization signals.

For example in 3GPP TS 38.214 V2.0.0 (2017-12) various transmission schemes are described, for example codebook based uplink transmission and non-codebook based uplink transmission. In particular, in chapter 6.1.1.1, codebook based uplink transmission is defined. Due to restrictions of the capabilities of the terminal device, a reliable uplink transmission may be established based on a codebook comprising coherent, non-coherent or partially coherent precoders. The UE may broadcast its capability to the network via RRC messages at the registration process at the network. In 3GPP release 15, a UE which reports to have non-coherent capability may only be scheduled rank one transmission with only one transmit antenna port at a time. In particular, different streams may not be mixed to the ports, i.e. one stream may have to be transmitted for each port. In the following, a mechanism will be described that enables an improved channel sounding between a non-coherent UE and the BS and therefore the restriction on uplink codebook can be removed.

The term coherence relates to the coherence between antenna ports. This means if a UE is capable of coherent transmission at certain antenna ports, it is possible to have those antenna ports with the same phase or with a constant and known phase offset. However, if the UE transmits signals from two antennas or antenna arrays from different sides of the UE, the transmissions may be non-coherent due to limitations in the frontend architecture due to the physical distance.

Traditionally, in codebook based transmission, only precoders within a restricted set of precoders, termed the non-coherent codebook set, are assigned to a non-coherent UE. This non-coherent codebook set contains only precoders that have one non-zero entry in each column of the vector, meaning that the precoder is only selecting one antenna element but not combining them. Therefore, transmit diversity among any pair of antenna elements is not possible.

To establish an uplink data transmission, UE 102 may sound the channel with sounding reference signals (SRS) which are precoded by one of the precoders within the non-coherent codebook set. Upon receiving the SRS, the BS 101 may estimate the uplink channel and determine the best precoder and send a signal to instruct the UE 102 which precoder is to be used in the following uplink transmission. However, the channel sounding signals (SRS) may be transmitted one or a few OFDM symbols before the downlink precoder instruction is sent. Likewise, the downlink precoder instruction may be sent a few OFDM symbols before the UE 102 sends uplink data. At the time instant of UE 102 sending uplink data, the non-coherent phase at the UE 102 may have changed and may be different from the estimation of the BS 101. In this case, the precoder would not be optimal anymore. Therefore, the uplink precoder may be selected from the non-coherent codebook set only. However, such non-coherent precoder selects a single antenna only but does not send the signal linearly combined via two or more antennas.

In the following, a mechanism is described in connection with FIG. 3 which allows the BS 101 to learn and predict this time varying phase and therefore to be able to provide an optimal precoder for UE 102 for use in subsequent UL transmissions. As will be explained in the following, there may be more frequent training signals and the precoders will no longer need to be restricted within the non-coherent codebook set.

In the following, an uplink rank one transmission is assumed. However, the principal is not limited to the rank one transmission. Likewise, in the following, it is assumed that the UE 102 comprises two antenna elements. However, the described principles may be easily extended to UEs having more than two antenna elements.

In non-coherent transmission, for the UE 102 two non-coherent precoders may be provided:

$$\begin{bmatrix} 1 \\ 0 \end{bmatrix} \text{ and } \begin{bmatrix} 0 \\ 1 \end{bmatrix}$$

which selects either the first or second antenna port.

These two precoders are the members of the so called non-coherent codebook set. For the UE 102 further (coherent) precoders may be provided in the codebook, for example, $$\begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix}$$

which linearly combine the antenna ports.

For the ease of illustration, it is assumed that both the UE 102 and BS 101 have two antenna ports. The received signal at the BS 101 can be described as $$\begin{bmatrix} y^1 \\ y^2 \end{bmatrix} = \begin{bmatrix} h^{11} & h^{12} \\ h^{21} & h^{22} \end{bmatrix} \begin{bmatrix} p^1 \\ p^2 \end{bmatrix} x + n$$

Where the channel matrix denotes the channel coefficients between the first and second antenna ports. The precoder $$\begin{bmatrix} p^1 \\ p^2 \end{bmatrix}$$

gives the weights with which the data is multiplied in the corresponding port. In the non-coherent case, $$\begin{bmatrix} p^1 \\ p^2 \end{bmatrix}$$

can only be $$\begin{bmatrix} 1 \\ 0 \end{bmatrix} \text{ or } \begin{bmatrix} 0 \\ 1 \end{bmatrix}.$$

As the non-coherent phase can be normalized with respect to the first antenna port, without loss of generality, it is assumed that the non-coherent phase is at the second antenna port and can be written as $$\begin{bmatrix} y^1 \\ y^2 \end{bmatrix} = \begin{bmatrix} h^{11} & h^{12} \\ h^{21} & h^{22} \end{bmatrix} \begin{bmatrix} p^1 \\ e^{j\mu} p^2 \end{bmatrix} x + n$$

The phase can be absorbed into the channel resulting in:

$$\begin{bmatrix} y^1 \\ y^2 \end{bmatrix} = \begin{bmatrix} h^{11} & e^{j\mu} h^{12} \\ h^{21} & e^{j\mu} h^{22} \end{bmatrix} \begin{bmatrix} p^1 \\ p^2 \end{bmatrix} x + n$$

With precoder $$\begin{bmatrix} p^1 \\ p^2 \end{bmatrix} = \begin{bmatrix} 1 \\ 0 \end{bmatrix}$$

for the uplink sounding signal, BS 101 can obtain channel estimate:

$$\overline{h}^1 = \begin{bmatrix} h^{11} \\ h^{21} \end{bmatrix}$$

Similarly, with precoder $$\begin{bmatrix} p^1 \\ p^2 \end{bmatrix} = \begin{bmatrix} 0 \\ 1 \end{bmatrix},$$

BS 101 can obtain channel estimate:

$$\overline{h}^2 = \begin{bmatrix} e^{j\mu} h^{12} \\ e^{j\mu} h^{22} \end{bmatrix}$$

BS 101 uses these two estimates to select an uplink precoder for the subsequent uplink transmissions.

Figure 3:
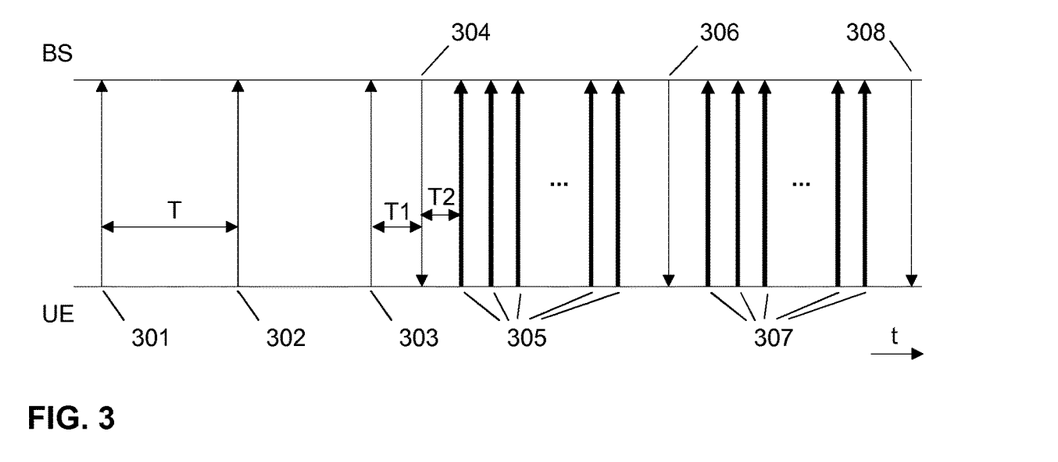
FIG. 3 schematically illustrates communicating uplink channel sounding reference signals, downlink control signals and uplink data signals on a wireless link between a base station and a terminal device.

FIG. 3 shows details on the communication between the BS 101 and the UE 102. Time period T denotes the time between two uplink SRS, for example between SRS 301 and SRS 302 or between SRS 302 and SRS 303. The SRS 301 to 303 may be sent using non-coherent precoders. Time period T1 denotes the time difference between the SRS 303 and a downlink signal 304 indicating the selected precoder. Time period T2 denotes the time difference between the downlink signal 304 indicating the selected precoder and uplink transmissions 305 with the instructed precoder. The estimation of the non-coherent phase may have changed significantly over the time periods T1 and T2, depending on the degree of the UE non-coherence. Therefore, estimation of the non-coherent phase relying on only one sounding signal may not be sufficient.

Therefore, BS 101 may observe and estimate the non-coherent channel via periodic channel sounding, for example SRS 301 to 303. If the BS 101 decides that it has collected enough observations of the uplink channel to construct an accurate statistical model of the random variable, i.e. the phase, it signals UE 102 a correspondingly selected precoder with the downlink signal 304 and continues to train the channel.

In the following uplink transmission, e.g. a PUSCH transmission, the optimal precoder is used. BS 101 estimates and updates the non-coherent phase estimate through the uplink reception. As BS 101 knows the time schedule of the uplink transmission, a time-adaptive filter of the random phase, such as a Kalman filter or Alpha beta filter, may be used. If the optimal precoder based on the adaptive channel estimate changes, BS 101 may signal the updated precoder through a downlink signal 306. The UE 102 then adopts the updated precoder in the following uplink transmissions 307. BS 101 continues estimating and updating the non-coherent phase estimate through the uplink reception 307 and may signal the updated precoder through a downlink signal 308, and so on.

BS 101 may select the optimal uplink precoder from the unrestricted codebook, therefore allowing linear combination of antenna ports, if appropriate. Having a larger set of precoders to choose from, UE 102 may be assigned with a precoder which allows linearly combing signals from different antenna ports. This may lead to a higher multiplexing gain.

In adopting the optimal precoder, the precoder index indicated by the BS 101 is no longer restricted to be within the non-coherent codebook set.

As the BS 101 may need more frequent training to obtain an accurate channel estimation, it may schedule more frequent uplink sounding. The UE 102 may be notified of the more frequent uplink SRS by resource allocation messages from the BS 101.

In the following, methods are described, which may be performed by the base station 101 and the terminal device 102 for accomplishing the above described techniques and principles.

Figure 4:
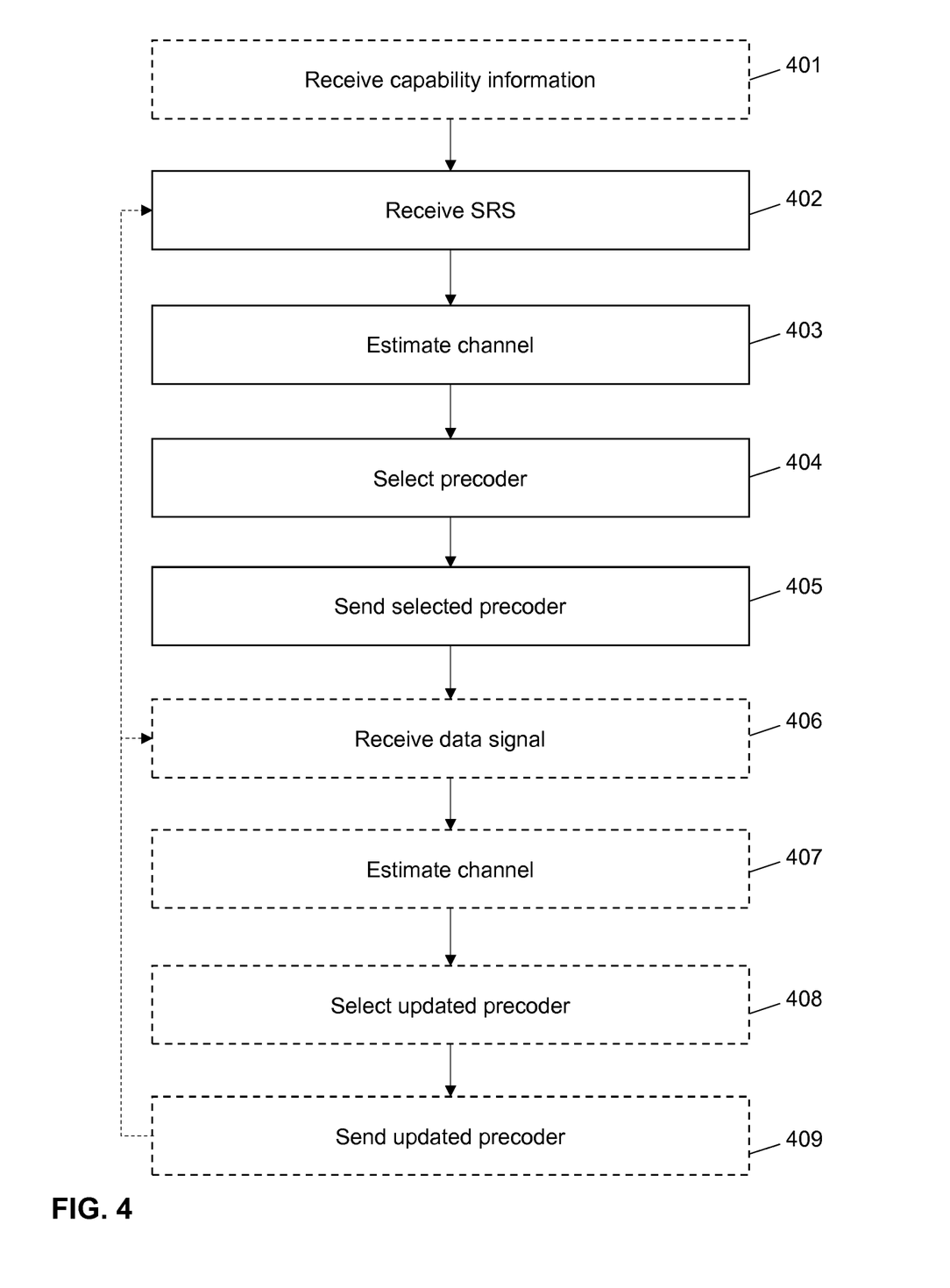
FIG. 4 is a flowchart of a method according to various examples.
Figure 5:
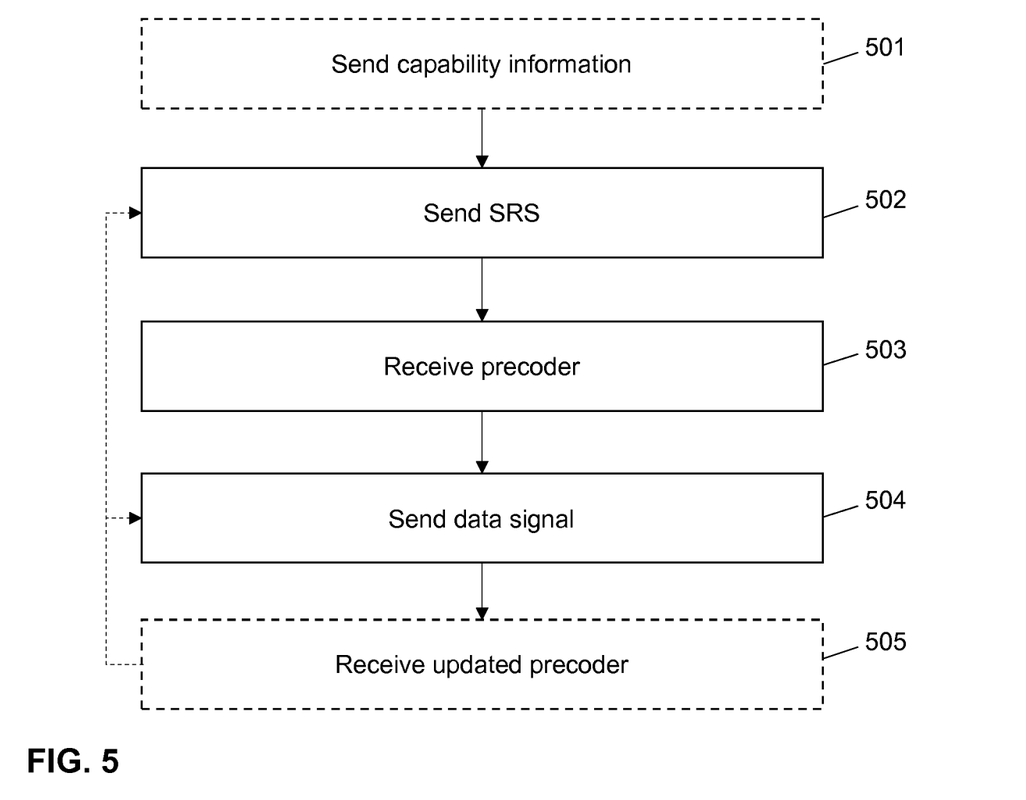
FIG. 5 is a flowchart of a further method according to various examples.

FIG. 4 is a flowchart of a method according to various examples. For example, the method according to FIG. 4 may be executed by the control circuitry 1011, 1015 of the BS 101. Likewise, the FIG. 5 is a flowchart of a method according to various examples of, which may be executed by the control circuitry 1021, 1025 of the UE 102. In FIG. 4 and FIG. 5, optional elements are indicated using dashed lines.

At optional block 501, the UE 102 may send capability information indicating that the UE 102 is restricted to non-coherent transmissions. The BS 101 may receive the capability information at optional block 401.

At block 502, the UE 102 may send a plurality of uplink sounding reference signals via each antenna port of the UE 102. Each sounding reference signal is sent using a precoder selected from the first set of precoders comprising for example non-coherent precoders only. For example, the UE 102 may send a corresponding uplink sounding reference signal for each non-coherent precoder provided in the first set of precoders. The UE 102 may repeat sending the plurality of uplink sounding reference signals periodically, for example based on a time schedule or based on resources allocated by the base station 101. At block 402, the BS 101 receives the uplink sounding reference signals from the UE 102.

At block 403, the BS 101 determines a channel estimate based on the received plurality of sounding reference signals. For example, the BS 101 may estimate a channel properties or characteristics based on a statistical analysis of the plurality of sounding reference signals.

At block 404, the BS 101 selects a precoder from a second set of precoders based on the determined channel estimate. The second set of precoders may comprise the non-coherent precoders of the first set of precoders and additionally coherent precoders. At block 405, the BS 101 sends an indication relating to the selected precoder. For example, the BS 101 may send an index indicative of an entry in the second set of precoders corresponding to the selected precoder. Additionally or as an alternative, the BS 101 may send parameters defining the selected precoder.

At block 503, the UE 102 receives the indication relating to the selected precoder from the BS 101.

At block 504, the UE 102 sends a data signal using the selected precoder. The data signal may comprise for example payload data, control data or a further sounding reference signal. As the selected precoder is not restricted to the non-coherent precoders of the first set of precoders, the selected precoder may be configured such that the data signal is sent via at least two of the at least two antenna ports of the UE 102. When sending the data signal via the at least two antenna ports, a phase shift may be included or the data signal may be transmitted with a different gain on each of the antenna ports. A plurality of data signals may be sent subsequently from the UE 102 at block 504 using the selected precoder.

At optional block 406, the BS 101 receives the data signal(s) from the UE 102. Based on the received data signals, the BS 101 further estimates channel properties at optional block 407. Based on this further estimation, the BS 101 may select an updated precoder at optional block 408, if the BS 101 determines based on the channel estimate that another precoder is more appropriate to be used with the current channel conditions. If the BS 101 has determined an updated precoder, the BS 101 may send an indication relating to the updated precoder to the UE 102 at optional block 409.

The UE 102 may receive the indication relating to the updated precoder at optional block 505 and may continue to send further data signals at block 504 using the updated precoder. Likewise, the BS 101 may continue to receive data signals at block 406.

Additionally, the UE 102 may send further sounding reference signals periodically at block 502, which may be received by the BS 101 at block 402.

The invention claimed is:

1. A method for operating a wireless communication device, the method comprising:
   receiving capability information relating to a further wireless communication device, the capability information indicating that the further communication device is restricted to non-coherent transmissions,
   receiving, from the further wireless communication device, a plurality of reference signals at an antenna port of the wireless communication device,
   determining a channel estimate based on the received plurality of reference signals,
   selecting a precoder from a second set of precoders based on the determined channel estimate, wherein the second set of precoders comprises at least one precoder in addition to precoders of a first set of precoders assigned for use by the further wireless communication device in sending the plurality of reference signals, and
   sending an indication relating to the selected precoder to a further wireless communication device from which the reference signals were received.

2. The method of claim 1, wherein the first set of precoders comprises non-coherent precoders only, and wherein the second set of precoders comprises non-coherent precoders as well as coherent precoders.

3. The method of claim 1, further comprising:
   receiving a data signal, which is sent using the selected precoder,
   determining a further channel estimate based on the received data signal,
   selecting a further precoder from the second set of precoders based on the determined further channel estimate, and
   sending an indication relating to the selected further precoder.

4. The method of claim 3, wherein determining the further channel estimate comprises:
   determining the further channel estimate based on a time schedule of the received data signal.

5. The method of claim 4, wherein determining the further channel estimate comprises:
   determining the further channel estimate using a time-adaptive filter based on the time schedule of the received data signal.

6. The method of claim 5, wherein the time-adaptive filter is used on the phase information of the received data signal for updating the non-coherent phase estimate.

7. The method of claim 3, wherein the data signal comprises at least one of a signal carrying payload, a signal carrying control information, and a sounding reference signal.

8. The method of claim 1, wherein the indication relating to the selected precoder comprises at least one of:
   an index indicative of an entry in the second set of precoders corresponding to the selected precoder, and
   at least one parameter defining the selected precoder.

9. The method of claim 1, wherein receiving the plurality of reference signals comprises receiving the plurality of reference signals at an antenna array coupled to the antenna port, the antenna array comprising at least two antennas.

10. The method of claim 1, further comprising
    allocating resources for receiving a further plurality of reference signals based on the further channel estimate, and
    sending a resource allocation message indicating the allocated resources.

11. A method for operating a wireless communication device, the wireless communication device comprising at least two antenna ports, each antenna port being coupled to a corresponding antenna, the method comprising:
    sending a plurality of reference signals via the at least two antenna ports, each reference signal being sent using a precoder selected from a first set of precoders,
    receiving an indication relating to a selected precoder selected from a second set of precoders,
    sending a data signal using the selected precoder,
    receiving an indication relating to a selected further precoder selected from the second set of precoders, and
    sending a further data signal using the selected further precoder,
    wherein the second set of precoders comprises at least one precoder in addition to the precoders of the first set of precoders.

12. The method of claim 11, wherein the first set of precoders comprises non-coherent precoders only, and wherein the second set of precoders comprises non-coherent precoders as well as coherent precoders.

13. The method of claim 11, further comprising:
    sending capability information indicating that the communication device is restricted to non-coherent transmissions.

14. The method of claim 11, wherein the indication relating to the selected precoder comprises at least one of:
    an index indicative of an entry in the second set of precoders corresponding to the selected precoder, and at least one parameter defining the selected precoder.

15. The method of claim 11, wherein the data signal comprises at least one of a signal carrying payload, a signal carrying control information, and a sounding reference signal.

16. The method of claim 11, wherein a first antenna coupled to a first antenna port of the at least two antenna ports is arranged at a first side of the communication device, and wherein a second antenna coupled to a second antenna port of the at least two antenna ports is arranged at a second side of the communication device different from the first side.

17. The method of claim 11, wherein each precoder of the first set of precoders is configured such that a signal, which is sent using the precoder, is sent via only one of the at least two antenna ports.

18. The method of claim 11, wherein the second set of precoders comprises at least one precoder configured such that sending the data signal using the precoder comprises at least one of:
   sending the data signal via at least two of the at least two antenna ports,
   sending the data signal via at least two of the at least two antenna ports with a phase shift, and
   sending the data signal via at least two of the at least two antenna ports with a different gain.

19. A wireless communication device comprising control circuitry configured to perform:
   receiving capability information relating to a further wireless communication device, the capability information indicating that the further communication device is restricted to non-coherent transmissions,
   receiving, from the further wireless communication device, a plurality of reference signals at an antenna port of the wireless communication device,
   determining a channel estimate based on the received plurality of reference signals,
   selecting a precoder from a second set of precoders based on the determined channel estimate, wherein the second set of precoders comprises at least one precoder in addition to precoders of a first set of precoders assigned for use by the further wireless communication device in sending the plurality of reference signals, and
   sending an indication relating to the selected precoder to a further wireless communication device from which the reference signals were received.

* * * * *